United States Patent
Ho et al.

(10) Patent No.: US 10,331,413 B2
(45) Date of Patent: Jun. 25, 2019

(54) RANDOM NUMBER GENERATING SYSTEM AND RANDOM NUMBER GENERATING METHOD THEREOF

(71) Applicant: Winbond Electronics Corp., Taichung (TW)

(72) Inventors: Wen-Chiao Ho, Taichung (TW); Pil-Sang Ryoo, Taichung (TW)

(73) Assignee: Winbond Electronics Corp., Taichung (TW)

( * ) Notice: Subject to any disclaimer, the term of this patent is extended or adjusted under 35 U.S.C. 154(b) by 57 days.

(21) Appl. No.: 15/842,833

(22) Filed: Dec. 14, 2017

(65) Prior Publication Data

US 2019/0114143 A1   Apr. 18, 2019

(30) Foreign Application Priority Data

Oct. 17, 2017 (CN) .......................... 2017 1 0965357

(51) Int. Cl.
   *G06F 7/58* (2006.01)
(52) U.S. Cl.
   CPC ................ *G06F 7/588* (2013.01); *G06F 7/58* (2013.01)
(58) Field of Classification Search
   CPC .................................. G06F 7/58; G06F 74/588
   See application file for complete search history.

(56) References Cited

U.S. PATENT DOCUMENTS

| | | | |
|---|---|---|---|
| 9,606,771 B2 | 3/2017 | Mei et al. | |
| 9,606,965 B2 | 3/2017 | Yoshimura et al. | |
| 2002/0093356 A1* | 7/2002 | Williams | G01R 31/31719 324/762.02 |
| 2012/0026784 A1* | 2/2012 | Kanai | G06F 7/588 365/158 |
| 2016/0062951 A1 | 3/2016 | Yoshimura et al. | |
| 2016/0103611 A1* | 4/2016 | Westlund | G06F 16/242 711/108 |
| 2017/0046129 A1 | 2/2017 | Cambou | |
| 2018/0046436 A1* | 2/2018 | Lu | G06F 7/588 |

* cited by examiner

*Primary Examiner* — Chuong D Ngo
(74) *Attorney, Agent, or Firm* — JCIPRNET (57) ABSTRACT

A random number generating system and a random number generating method thereof are provided. The random number generating system includes a random number generator, a random mask circuit, a bit reduction logic circuit and a receiver. The random number generator provides a random number sequence. The random mask circuit receives the random number sequence to provide a random number mask sequence and a random mask indication sequence, wherein bits of the random mask indication sequence in a first logical level corresponded to bits of the random number mask sequence in the high impedance state. The bit reduction logic circuit receives the random number sequence and the random mask indication sequence to provide the comparison key. The receiver receives a random number mask sequence to provide a verification key, where the verification key is the same as the comparison key.

18 Claims, 4 Drawing Sheets

RANDOM NUMBER GENERATING SYSTEM AND RANDOM NUMBER GENERATING METHOD THEREOF

CROSS-REFERENCE TO RELATED APPLICATION

This application claims the priority benefit of China application serial no. 201710965357.7, filed on Oct. 17, 2017. The entirety of the above-mentioned patent application is hereby incorporated by reference herein and made a part of this specification.

TECHNICAL FIELD

The invention is related to a way of generating a random number, and particularly to a random number generating system and a random number generating method thereof.

DESCRIPTION OF RELATED ART

In recent years, along with prosperous development of computer information technology, use of memory product becomes increasingly frequent, and data security issue of memory product also becomes significantly important. Generally speaking, a key is required for memory product to encrypt/decrypt data, or the key is required to ensure whether external access (e.g., reading, writing, erasing) is permitted. Specifically, the key may be a random number generated by a random number generator, and unpredictability of the random number is decisive to security of data. It is an important issue of the field of design of random number generator to find out how to increase unpredictability (e.g., increase the bit number of random number) of random number.

SUMMARY OF INVENTION

The invention provides a random number generating system and a random number generating method thereof, which are capable of processing a random number sequence generated by a random number generator to provide a key with variable bit so as to increase unpredictability of the key.

In the invention, a random number generating system includes a random number generator, a random mask circuit, a bit reduction logic circuit and a receiver. The random number generator provides a random number sequence with n bits, wherein n is a positive integer. The random mask circuit is coupled to the random number generator to receive the random number sequence and receive a key request signal to provide a random number mask sequence with n bits and a random mask indication sequence with n bits, wherein bits of the random number mask sequence are respectively in a first logical level, a second logical level or a high impedance state, and bits of the random mask indication sequence in the first logical level correspond to bits of the random number mask sequence in the high impedance state. The bit reduction logic circuit is coupled to the random number generator and the random mask circuit to receive the random number sequence and the random mask indication sequence so as to provide a comparison key, wherein the bit number of the comparison key is smaller than or equal to n. The receiver is coupled to the random mask circuit to receive the random number mask sequence to provide a verification key, where the verification key is the same as the comparison key.

In the invention, a random number generating method includes the following steps. A random number sequence with n bits is generated by a random number generator, wherein n is a positive integer. The random number sequence and a key request signal are received by a random mask circuit to provide a random number mask sequence with n bits and a random mask indication sequence with n bits, wherein the bits of the random number mask sequence are respectively in a first logical level, a second logical level or a high impedance state, and bits of the random mask indication sequence in the first logical level correspond to bits of the random number mask sequence in the high impedance state. The random number sequence and the random mask indication sequence are received by a bit reduction logic circuit to provide a comparison key, wherein the bit number of the comparison key is smaller than or equal to n. The random number mask sequence is received by a receiver to provide a verification key, wherein the verification key is the same as the comparison key.

In summary, the random number generating system and the random number generating method of the invention are capable of processing the random number sequence generated by the random number generator to determine whether the bit in the random number sequence is to be retained, and the comparison key with variable bit as well as verification key with variable bit are provided accordingly, so that the unpredictability of the comparison key and verification key can be increased.

In order to make the aforementioned features and advantages of the invention more comprehensible, embodiments accompanying figures are described in detail below.

DESCRIPTION OF EMBODIMENTS

Figure 1:
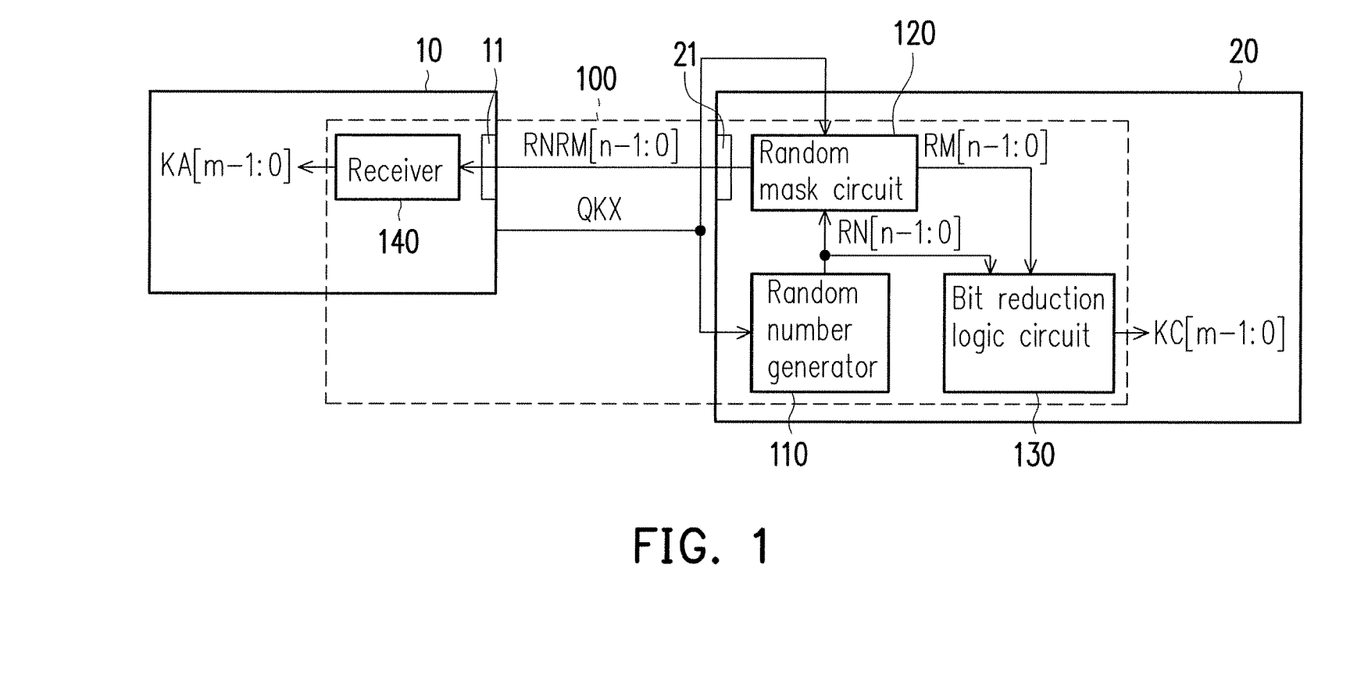
FIG. 1 is a system diagram illustrating a random number generating system according to an embodiment of the invention.

Referring to FIG. 1, in the embodiment, a random number generating system 100 includes a random number generator 110, a random mask circuit 120, a bit reduction logic circuit 130 and a receiver 140, wherein the receiver 140 is disposed on a system side circuit 10; the random number generator 110, the random mask circuit 120 and the bit reduction circuit 130 are disposed on a memory side circuit 20. The system side circuit 10 is, for example, a bridge chip of a processor or between a processor and a memory; the memory side circuit 20 is, for example, a memory controller, which should not be construed as a limitation to the invention.

The system side circuit 10 and the memory side circuit 20 are coupled to each other via their signal interfaces 11 and 21. When the system side circuit 10 is to access the memory, a key request signal QKX is transmitted (or provided) to the memory side circuit 20 to acquire a verification key (e.g., KA[m−1:0]) required for passing verification. Specifically, the key request signal QKX may be transmitted via the signal interfaces 11 and 21, which should not be construed as a limitation to the invention.

When the key request signal QKX is received, the random number generator 110 provides a random number sequence RN[n−1:0] with n bits, wherein n is a positive integer larger than 0. The random mask circuit 120 is coupled to the random number generator 110 to receive the random number sequence RN[n−1:0]. Moreover, when the key request signal QKX is received, the random mask circuit 120 provides a random number mask sequence RNRM[n−1:0] with n bits and a random mask indication sequence RM[n−1:0]. Here, all the bits of the random number mask sequence RNRM[n−1:0] are respectively in a first logical level "1", a second logical level "0" or a high impedance state "Z". Meanwhile, the random mask indication sequence RM[n−1:] are respectively in the first logical level "1" or the second logical level "0", wherein the bits of the random mask indication sequence RM[n−1:0] in the first logical level "1" correspond to the bits of the random number mask sequence RNRM[n−1:0] in the high impedance state "Z".

The bit reduction logic circuit 130 is coupled to the random number generator 110 and the random mask circuit 120 to receive the random number sequence RN[n−1:0] and the random mask indication sequence RM[n−1:0] so as to determine whether each of the bits in the random number sequence RN[n−1:0] is to be retained according to the random mask indication sequence RM[n−1:0], and provide a comparison key KC[m−1:0] according to the bits retained in the random number sequence RN[n−1:0], wherein the bit number of the comparison key KC[m−1:0] is smaller than or equal to n, that is m is a positive integer smaller than or equal to n.

The receiver 140 is coupled to the random mask circuit 120 to receive the random number mask sequence RNRM[n−1:0] to delete the bits of the random number mask sequence RNRM[n−1:0] in the high impedance state "Z", and provide a verification key KA[m−1:0] according to the undeleted (retained) bits in the random number mask sequence RNRM[n−1:0], wherein the verification key KA[m−1:0] is the same as the comparison key KC[m−1:0]. In other words, when each of the bits of the random number mask sequence RNRM[n−1:0] is in the first logical level "1" or the second logical level "0", the receiver 140 retains each of the bits. When each of the bits of the random number mask sequence RNRM[n−1:0] is in the high impedance state "Z", the receiver 140 deletes (or discards) each of the bits.

Based on the above, since the bit number of the verification key KA[m−1:0] is variable, and the verification key KA[m−1:0] is the same as the comparison key KC[m−1:0], the unpredictability of the verification key KA[m−1:0] can be increased, and success of verification can be ensured.

Figure 2:
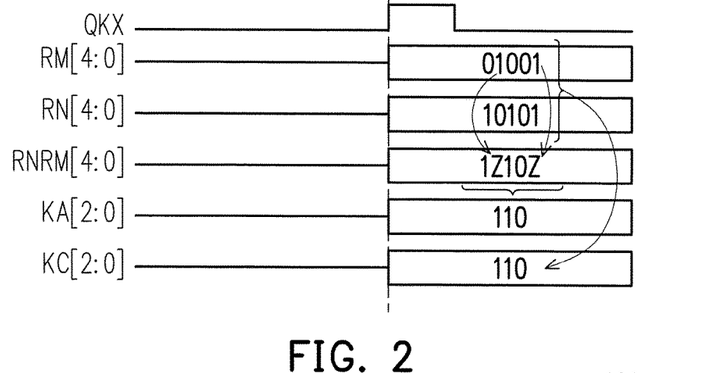
FIG. 2 is an operation diagram illustrating a random number generating system according to an embodiment of the invention.

Referring to FIG. 1 and FIG. 2, in the embodiment, when the key request signal QKX is enabled, the random number generator 110 provides a random number sequence RN[4:0] with 5 bits, wherein the random number sequence RN[4:0] is "10101", for example. In the meantime, the random mask circuit 120 provides the random number mask sequence RNRM[4:0] with 5 bits and the random mask indication sequence RM[4:0] with 5 bits, wherein the random mask indication sequence RM[4:0] is "01001", for example, and the random number mask sequence RNRM[4:0] is "1Z10Z".

Specifically, the random mask circuit 120 generates the random mask indication sequence RM[4:0] first. Next, the random mask circuit 120 processes the random number sequence RN[4:0] according to the random mask indication sequence RM[4:0] to generate the random number mask sequence RNRM[4:0]. In other words, the random number mask sequence RNRM[4:0] includes information of the random mask indication sequence RM[4:0] and the random number sequence RN[4:0]. That is to say, the random mask circuit 120 replaces a portion of the random number sequence RN[4:0] corresponding to a portion of the random mask indication sequence RM[4:0] in the first logical level "1" with the high impedance state "Z", thereby generating the random number mask sequence RNRM[4:0] having the first logical level "1", the second logical level "0" or the high impedance state "Z", such that the information of the random mask indication sequence RM[4:0] and the random number sequence RN[4:0] can be transmitted via a set of sequence. In this manner, there is no need to change the pin and signal receiving manner of the system side circuit 10 and the memory side circuit 20.

After the random number sequence RN[4:0] and the random mask indication sequence RM[4:0] are received, the bit reduction logic circuit 130 processes the random number sequence RN[4:0] according to the random mask indication sequence RM[4:0] to generate the comparison key KC[2:0]. Specifically, when each of the bits of the random mask indication sequence RM[4:0] is in the first logical level "1", the bit reduction logic circuit 130 deletes (or discards) the corresponding bits of the random number sequence RN[4:0]; when each of the bits of the random mask indication sequence RM[4:0] is in the second logical level "0", the bit reduction logic circuit 130 retains the corresponding bit in the random number sequence RN[4:0]. Thereafter, the bit reduction logic circuit 130 outputs the retained bits in the random number sequence RN[4:0] as the comparison key KC[2:0]. Since the random mask indication sequence RM[4:0] has two bits in the first logical level "1", the bit reduction logic circuit 130 generates the comparison key KC[2:0] (i.e., "110") with 3 bits; that is, the comparison key KC[2:0] is constituted by the bits retained in the random number sequence RN[4:0].

After the random number mask sequence RNRM[4:0] is received, the receiver 140 provides the verification key KA[2:0] according to the random number mask sequence RNRM[4:0]. Specifically, the receiver 140 deletes (or discards) the bits of the random number mask sequence RNRM[4:0] in the high impedance state "Z", and retains the bits of the random number mask sequence RNRM[4:0] in the first logical level "1" or the second logical level "0". Thereafter, the receiver 140 outputs the bits retained in the random number mask sequence RNRM[4:0] as the verification key KA[2:0]. Since the random number mask sequence RNRM[4:0] has two bits that are in the high impedance state "Z", the bit reduction logic circuit 130 generates the verification key KA[2:0] (i.e., "110") with 3 bits; that is, the verification key KA[2:0] is constituted by the bits retained in the random number mask sequence RNRM[4:0].

Figure 3:
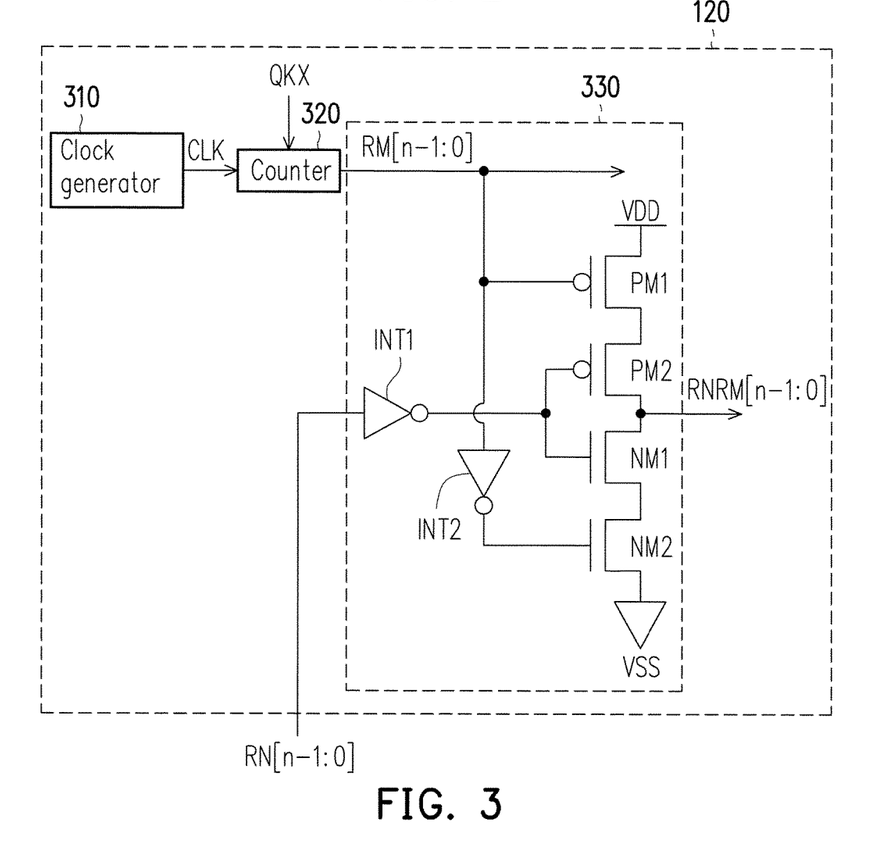
FIG. 3 is a circuit diagram illustrating a random mask circuit according to an embodiment of the invention.

Referring to FIG. 1 and FIG. 3, in the embodiment, the random mask circuit 120 includes a clock generator 310, a counter 320 and a mask circuit 330. The clock generator 310 generates a clock signal CLK, wherein the operation of the clock generator 310 is irrelevant to the operation of the random number generator 110. The counter 320 receives the clock signal CLK and the key request signal QKX to perform cycle counting, and provides the random mask indication sequence RM[n−1:0] in response to the key request signal QKX. The mask circuit 330 is coupled to the counter 320 to receive the random mask indication sequence RM[n−1:0] and receives the random number sequence RN[n−1:0], wherein the mask circuit 330 processes the random number sequence RN[n−1:0] according to the random mask indication sequence RM[n−1:0] to provide the random number mask sequence RNRM[n−1:0].

The mask circuit 330 includes a first inverter INT1, a second inverter INT2, a first p-type transistor PM1, a second p-type transistor PM2, a first n-type transistor NM1 and a second n-type transistor NM2. The first inverter INT1 has an input end receiving the random number sequence RN[n−1:0] and an output end. The second inverter INT2 has an input end receiving the random mask indication sequence RM[n−1:0] and an output end.

The first p-type transistor PM1 has a first end receiving a system high voltage VDD, a control end receiving the random mask indication sequence RM[n−1:0] and a second end. The second p-type transistor PM2 has a first end that is coupled to the second end of the first p-type transistor PM1, a control end that is coupled to the output end of the first inverter INT1, and a second end that provides the random number mask sequence RNRM[n−1:0].

The first n-type transistor NM1 has a first end that is coupled to the second end of the second p-type transistor PM2, a control end that is coupled to the output end of the first inverter INT1 and a second end. The second n-type transistor NM2 has a first end that is coupled to the second end of the first n-type transistor NM1, a control end that is coupled to the output end of the second inverter INT2 and a second end receiving a system low voltage VSS.

Based on the above, when each of the bits of the random mask indication sequence RM[n−1:0] is in the first logical level "1" (e.g., as system high voltage VDD), the first p-type transistor PM1 and the second n-type transistor NM2 are cut off, such that the output end (i.e., second end of the second p-type transistor PM) of the mask circuit 330 is floated; that is, the corresponding bits in the random number mask sequence RNRM[n−1:0] is in the high impedance state "Z". When each of the bits of the random mask indication sequence RM[n−1:0] is in the first logical level "0" (e.g., as system low voltage VSS), the first p-type transistor PM1 and the second n-type transistor NM2 are turned on, such that the first p-type transistor PM1, the second p-type transistor PM2, the first n-type transistor NM1 and the second n-type transistor NM2 operate as an inverter, such that the logical level (e.g., first logical level "1" or second logical level "0") of the corresponding bits in the random number mask sequence RNRM[n−1:0] is the same as the logical level (e.g., first logical level "1" or second logical level "0") of the corresponding bits in the random number sequence RN[n−1:0].

Figure 4:
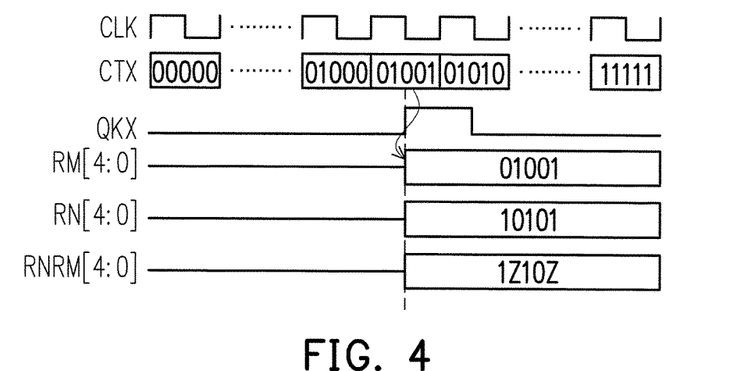
FIG. 4 is an operation diagram illustrating a random mask circuit according to an embodiment of the invention.

Referring to FIG. 3 and FIG. 4, in the embodiment, the counter 320 is exemplified as the counter with 5 bits; that is, a counting value CTX of the counter 320 may be counted from "00000" to "11111" and repeated continuously. Thereafter, when the key request signal QKX is disabled (e.g., as system low voltage VSS), the counter 320 does not output the counting value CTX. When the key request signal QKX is enabled (e.g., as system high voltage VDD), the counter 320 provides the value "01001" of the current counting result CTX as the random mask indication sequence RM[4:0].

Subsequently, the mask circuit 330 processes the random number sequence RN[4:0] (i.e., "10101") according to the random mask indication sequence RM[4:0] (i.e., "01001") to provide the random number mask sequence RNRM[4:0] (i.e., "1Z10Z"). Based on the above, the state of the random mask indication sequence RM[4:0] is determined by the time point at which the counter 320 receives the key request signal QKX; that is, different random mask indication sequences RM[4:0] are generated at different time points. Moreover, similarly, the number of bits in the random number mask sequence RNRM[4:0] in the high impedance state "Z" is determined by the time point at which the counter 320 receives the key request signal QKX; that is, different number of bits that are in the high impedance state "Z" is generated at different time points.

Figure 5:
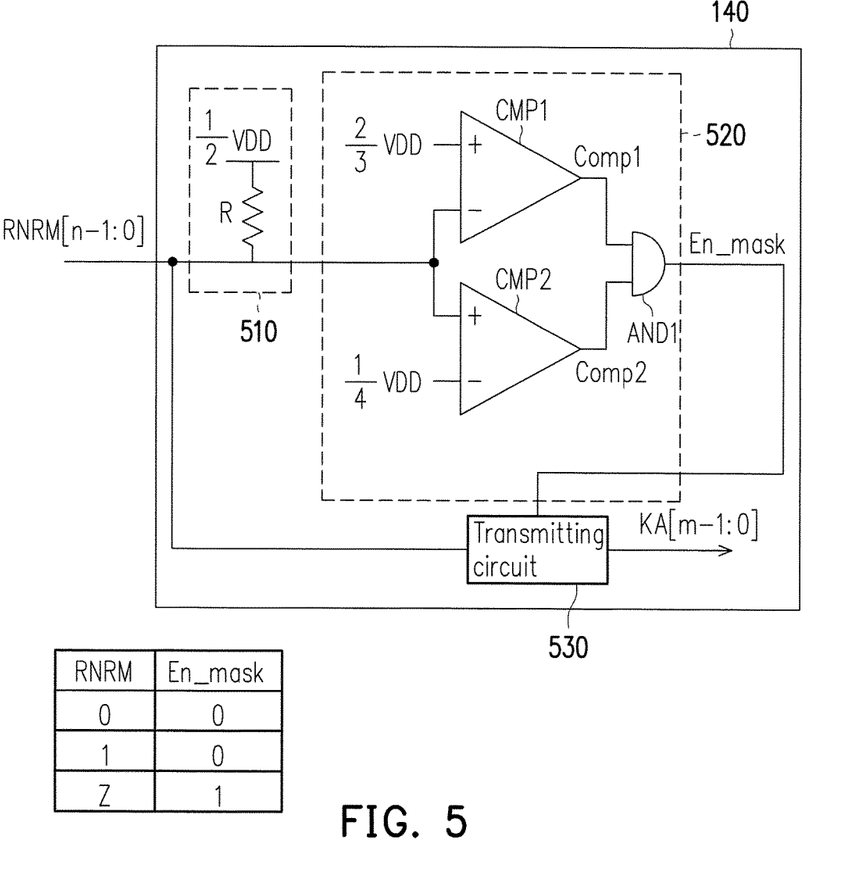
FIG. 5 is a circuit diagram illustrating a receiver according to an embodiment of the invention.

Referring to FIG. 1 and FIG. 5, in the embodiment, the receiver 140 includes a power supply circuit 510, a comparator circuit 520 and a transmitting circuit 530. The power supply circuit 510 receives the random number mask sequence RNRM[n−1:0] such that a reference logical level (e.g., ½VDD) is provided when each of the bits of the random number mask sequence RNRM[n−1:0] is in the high impedance state "Z", and the first logical level "1" or the second logical level "0" are directly provided when each of the bits of the random number mask sequence RNRM[n−1:0] is in the first logical level "1" (e.g., as system high voltage VDD) or the second logical level "0" (e.g., as system low voltage VSS), wherein the reference logical level is set to be between the first logical level "1" and the second logical level "0".

The comparator circuit 520 is coupled to the power supply circuit 510 to receive the logical level (i.e., reference logical level, first logical level "1" or second logical level "0") provided by the power supply circuit 510, and provides a mask enabling signal En-mark according to the logical level provided by the power supply circuit 510. Specifically, when the power supply circuit 510 provides the reference logical level, the mask enabling signal En-mark having the first logical level "1" is output; when the power supply circuit 510 provides the first logical level "1" or the second logical level "0", the mask enabling signal En mark having the second logical level "0" is output.

The transmitting circuit 530 is coupled to the comparator circuit 520 to receive the mask enabling signal En-mark, and receives the random number mask sequence RNRM[n−1:0] to provide the verification key KA[m−1:0]. Specifically, when the mask enabling signal En-mark is in the first logical level "1", the transmitting circuit 530 blocks the random number mask sequence RNRM[n−1:0]; when the mask enabling signal En-mark is in the second logical level "0", the transmitting circuit 530 directly outputs the random number mask sequence RNRM[n−1:0].

In the embodiment, the power supply circuit 510 includes a resistance R. The resistance R is coupled between the reference logical level (e.g., ½VDD) and the random number mask sequence RNRM[n−1:0]. In the meantime, when each of the bits of the random number mask sequence RNRM[n−1:0] is in the high impedance state "Z", a cross-voltage of the resistance R is about 0; therefore, the reference logical level (e.g., ½VDD) is provided to the comparator circuit 520; when each of the bits of the random number mask sequence RNRM[n−1:0] is in the first logical level "1" (e.g., as system high voltage VDD) or the second logical level "0" (e.g., as system low voltage VSS), the resistance R generates the cross-voltage such that the first logical level "1" and the second logical level "0" are directly transmitted to the comparator circuit 520.

In the embodiment, the comparator circuit 520 includes a first comparator CMP1, a second comparator CMP2 and an AND gate AND1. The first comparator CMP1 includes a positive input end receiving a high threshold level (e.g., ⅔VDD), a negative input end coupled to the power supply circuit 510 and an output end providing a comparison result Comp1. The second comparator CMP2 includes a positive input end coupled to the power supply circuit 510, a negative input end receiving a low threshold level (e.g., ¼VDD) and an output end providing a comparison result Comp2. The AND gate AND1 is coupled to the output end of the first comparator CMP1 and the output end of the second comparator COMP2 to receive the comparison results Comp1 and Comp2, and is provided the mask enabling signal En-mark according to the comparison results Comp1 and Comp2. Specifically, the high threshold level is set to be between the first logical level "1" (e.g., as system high voltage VDD) and the reference logical level (e.g., ½VDD). The low threshold level is set to be between the second logical level (e.g., as system low voltage VSS) and the reference logical level (e.g., ½VDD).

Furthermore, when each of the bits of the random number mask sequence RNRM[n−1:0] is in the high impedance state "Z", the power supply circuit 510 outputs the reference logical level (e.g., ½VDD), and the comparison results Comp1 and Comp2 are both in the first logical level "1" (e.g., as system high voltage VDD); therefore, the mask enabling signal En-mark is in the first logical level "1" (e.g., as system high voltage VDD). At this time, the transmitting circuit 530 blocks the corresponding bits in the random number mask sequence RNRM[n−1:0].

When each of the bits of the random number mask sequence RNRM[n−1:0] is in the first logical level "1" (e.g., as system high voltage VDD) or the second logical level "0" (e.g., as system low voltage VSS), one of the comparison results Comp1 and Comp2 is in the second logical level "0" (e.g., as system low voltage VSS); therefore, the mask enabling signal En-mark is in the second logical level "0" (e.g., as system low voltage VSS). At this time, the transmitting circuit 530 directly transmits the corresponding bits of the random number mask sequence RNRM[n−1:0].

Figure 6:
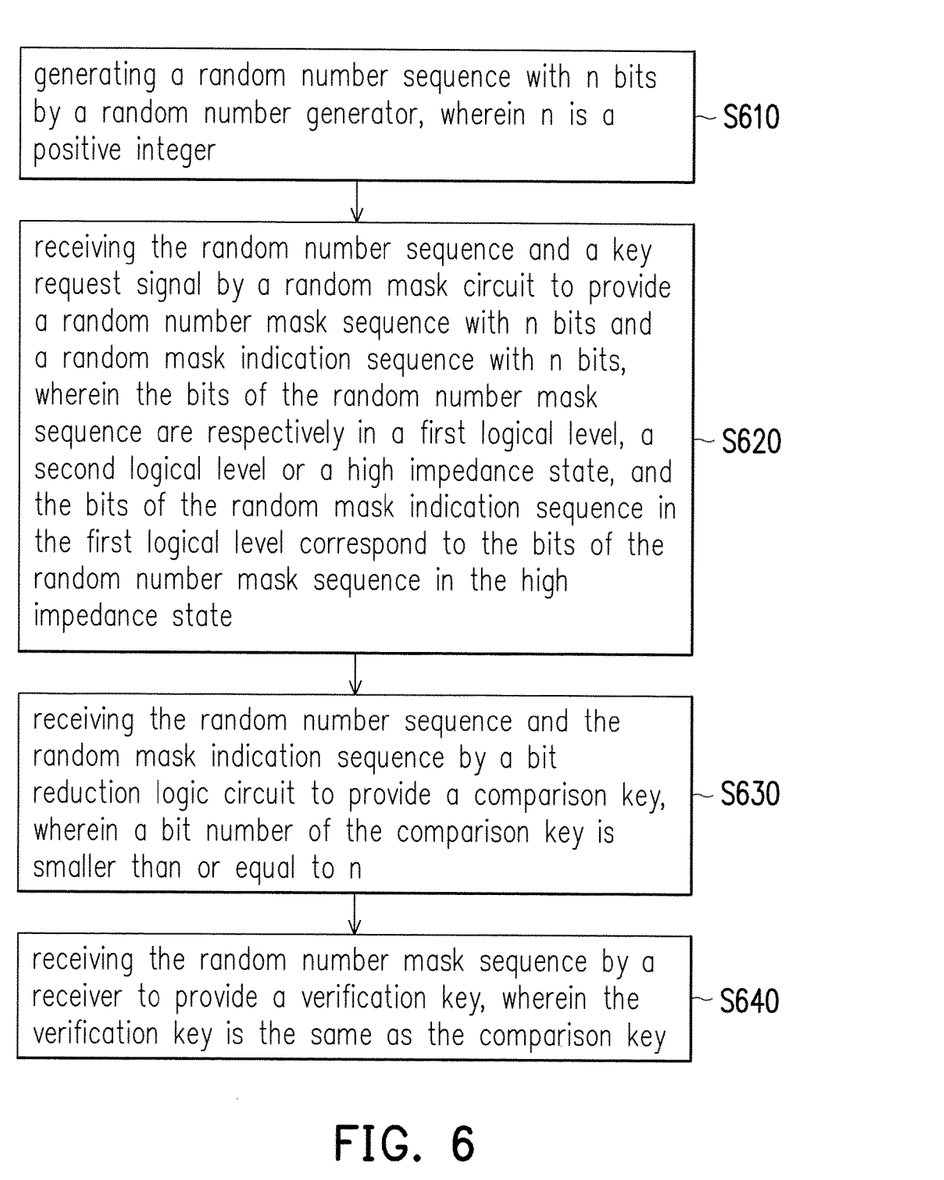
FIG. 6 is a flowchart illustrating a random number generating method according to an embodiment of the invention.

Referring to FIG. 6, in the embodiment, a random number generating method includes the following steps. In step S610, the random number sequence with n bits is generated by the random number generator, wherein n is a positive integer. In step S620, the random number sequence and the key request signal are received by the random mask circuit to provide the random number mask sequence with n bits and the random mask indication sequence with n bits, wherein the bits of the random number mask sequence are respectively in the first logical level, the second logical level or the high impedance state; moreover, the bits of the random mask indication sequence in the first logical level in correspond to the bits of the random number mask sequence in the high impedance state. In step S630, the random number sequence and the random mask indication sequence are received by the bit reduction logic circuit to provide the comparison key, wherein the bit number of the comparison key is smaller than or equal to n. In step S640, the random number mask sequence is received by the receiver to provide the verification key, wherein the verification key is the same as the comparison key.

Specifically, the above-mentioned steps S610, S620, S630 and S640 and the sequence thereof are for descriptive purpose only, which should not be construed as a limitation to the embodiments of the invention. Moreover, the embodiments of FIG. 1 to FIG. 5 may serve as reference for the details of steps S610, S620, S630 and S640, and thus no further descriptions are incorporated herein.

In summary, the random number generating system and the random number generating method of the invention are capable of processing the random number sequence generated by the random number generator to determine whether the bits in the random number sequence are to be retained, and the comparison key and verification key with variable bit can be provided accordingly. In this manner, the unpredictability of the comparison key and verification key can be increased.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A random number generating system, comprising:
    a random number generator, providing a random number sequence with n bits, wherein n is a positive integer;
    a random mask circuit, coupled to the random number generator to receive the random number sequence, and receiving a key request signal to provide a random number mask sequence with n bits and a random mask indication sequence with n bits, wherein the bits of the random number mask sequence are respectively in a first logical level, a second logical level or a high impedance state, and the bits of the random mask indication sequence in the first logical level correspond to the bits of the random number mask sequence in the high impedance state;
    a bit reduction logic circuit, coupled to the random number generator and the random mask circuit to receive the random number sequence and the random mask indication sequence to provide a comparison key, wherein a bit number of the comparison key is smaller than or equal to n; and
    a receiver, coupled to the random mask circuit to receive the random number mask sequence to provide a verification key, wherein the verification key is the same as the comparison key.

2. The random number generating system according to claim 1, wherein a number of the bits of the random number mask sequence in the high impedance state is determined by a time point at which the key request signal is received.

3. The random number generating system according to claim 1, wherein the random mask circuit comprises:
    a clock generator, generating a clock signal, wherein an operation of the clock generator is irrelevant to an operation of the random number generator;
    a counter, receiving the clock signal and the key request signal to perform cycle counting and providing the random mask indication sequence in response to the key request signal; and
    a mask circuit, coupled to the counter to receive the random mask indication sequence and receiving the random number sequence, wherein the mask circuit processes the random number sequence according to the random mask indication sequence to provide the random number mask sequence.

4. The random number generating system according to claim 3, wherein the mask circuit comprises:
    a first inverter, having an input end receiving the random number sequence and an output end;
    a second inverter, having an input end receiving the random mask indication sequence and an output end;
    a first p-type transistor, having a first end receiving a system high voltage, a control end receiving the random mask indication sequence and a second end;
    a second p-type transistor, having a first end coupled to the second end of the first p-type transistor, a control end coupled to the output end of the first inverter, and a second end providing the random number mask sequence;

a first n-type transistor, having a first end coupled to the second end of the second p-type transistor, a control end coupled to the output end of the first inverter, and a second end; and a second n-type transistor, having a first end coupled to the second end of the first n-type transistor, a control end coupled to the output end of the second inverter, and a second end receiving a system low voltage.

5. The random number generating system according to claim 1, wherein when each of the bits of the random number mask sequence is in the first logical level or the second logical level, the receiver retains each of the bits, and when each of the bits of the random number mask sequence is in the high impedance state, the receiver deletes each of the bits.

6. The random number generating system according to claim 1, wherein the receiver comprises:
   a power supply circuit, receiving the random number mask sequence, so as to provide a reference logical level when each of the bits of the random number mask sequence is in the high impedance state, and directly provide the first logical level or the second logical level when each of the bits of the random number mask sequence is in the first logical level or the second logical level, wherein the reference logical level is provided between the first logical level and the second logical level;
   a comparator circuit, coupled to the power supply circuit to provide a mask enabling signal, when the power supply circuit provides the reference logical level, the mask enabling signal having the first logical level is output, when the power supply circuit provides the first logical level or the second logical level, the mask enabling signal having the second logical level is output; and
   a transmitting circuit, coupled to the comparator circuit to receive the mask enabling signal and receiving the random number mask sequence to provide the verification key, when the mask enabling signal is in the first logical level, the transmitting circuit blocks the random number mask sequence, and when the mask enabling signal is in the second logical level, the transmitting circuit directly outputs the random number mask sequence.

7. The random number generating system according to claim 6, wherein the power supply circuit comprises a resistance, coupled between the reference logical level and the random number mask sequence.

8. The random number generating system according to claim 6, wherein the comparator circuit comprises:
   a first comparator, comprising a positive input end receiving a high threshold level, a negative input end coupled to the power supply circuit and an output end;
   a second comparator, comprising a positive input end coupled to the power supply circuit, a negative input end receiving a low threshold level and an output end; and
   an AND gate, coupled to the output end of the first comparator and the output end of the second comparator to provide the mask enabling signal.

9. The random number generating system according to claim 8, wherein the high threshold level is provided between the first logical level and the reference logical level, the low threshold level is provided between the second logical level and the reference logical level.

10. The random number generating system according to claim 1, wherein when each of the bits of the random mask indication sequence is in the first logical level, the bit reduction logic circuit deletes the corresponding bits in the random number sequence, and when each of the bits of the random mask indication sequence is in the second logical level, the bit reduction logic circuit retains the corresponding bits in the random number sequence.

11. The random number generating system according to claim 1, wherein the random number generator, the random mask circuit sand the bit reduction logic circuit are disposed on a memory side circuit, and the receiver is disposed on a system side circuit.

12. The random number generating system according to claim 11, wherein the receiver is coupled to the random mask circuit via a signal interface.

13. The random number generating system according to claim 11, wherein the key request signal is provided by the system side circuit.

14. A random number generating method, comprising:
   generating a random number sequence with n bits by a random number generator, wherein n is a positive integer;
   receiving the random number sequence and a key request signal by a random mask circuit to provide a random number mask sequence with n bits and a random mask indication sequence with n bits, wherein the bits of the random number mask sequence are respectively in a first logical level, a second logical level or a high impedance state, and the bits of the random mask indication sequence in the first logical level correspond to the bits of the random number mask sequence in the high impedance state;
   receiving the random number sequence and the random mask indication sequence by a bit reduction logic circuit to provide a comparison key, wherein a bit number of the comparison key is smaller than or equal to n; and
   receiving the random number mask sequence by a receiver to provide a verification key, wherein the verification key is the same as the comparison key.

15. The random number generating method according to claim 14, wherein a number of the bits of the random number mask sequence in the high impedance state is determined by a time point at which the key request signal is received.

16. The random number generating method according to claim 14, wherein the step of generating the verification key comprises:
   when each of the bits of the random number mask sequence is in the first logical level or the second logical level, the receiver retains each of the bits; and
   when each of the bits of the random number mask sequence is in the high impedance state, the receiver deletes each of the bits;
   wherein the verification key is constituted by the bits retained in the random number mask sequence.

17. The random number generating method according to claim 14, wherein the step of generating the comparison key comprises:
   when each of the bits of the random mask indication sequence is in the first logical level, the bit reduction logic circuit deletes the corresponding bits in the random number sequence; and when each of the bits of the random mask indication sequence is in the second logical level, the bit reduction logic circuit retains the corresponding bits in the random number sequence;

wherein the comparison key is constituted by the bits retained in the random number sequence.

18. The random number generating method according to claim 14, wherein the random number generator, the bit reduction logic circuit and the bit reduction logic circuit are disposed on a memory side circuit, and the receiver is disposed on a system side circuit.

* * * * *